United States Patent
Weissman et al.

(10) Patent No.: US 11,778,651 B2
(45) Date of Patent: *Oct. 3, 2023

(54) MITIGATION OF INTER-BAND INTERFERENCE TO RECEIVERS BY ALLOCATING ALERTS IN FREQUENCY DOMAIN BASED ON SEVERITY

(71) Applicant: QUALCOMM Incorporated, San Diego, CA (US)

(72) Inventors: Haim Mendel Weissman, Haifa (IL); Alexander Vladimir Sverdlov, Rehovot (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,788

(22) Filed: Mar. 3, 2022

(65) Prior Publication Data

US 2022/0191877 A1  Jun. 16, 2022

Related U.S. Application Data

(63) Continuation of application No. 15/930,097, filed on May 12, 2020, now Pat. No. 11,291,013.

(51) Int. Cl.
*H04L 12/28* (2006.01)
*H04W 72/541* (2023.01)
(Continued)

(52) U.S. Cl.
CPC ........ *H04W 72/541* (2023.01); *H04B 17/318* (2015.01); *H04W 72/0453* (2013.01)

(58) Field of Classification Search
CPC ... H04B 17/318; H04W 72/0453; H04L 12/28
(Continued)

(56) References Cited

U.S. PATENT DOCUMENTS 7,084,775 B1 * 8/2006 Smith ................. H04L 12/1895
340/905
11,024,105 B1    6/2021 Brand et al.
(Continued)

FOREIGN PATENT DOCUMENTS

WO    2015131744 A1    9/2015
WO    2016065885 A1    5/2016

OTHER PUBLICATIONS

International Search Report and Written Opinion—PCT/US2021/031641—ISA/EPO—dated Jul. 19, 2021.

*Primary Examiner* — Dang T Ton
(74) *Attorney, Agent, or Firm* — ArentFox Schiff LLP

(57) ABSTRACT

A transmitting device may select frequency domain resources for an alert transmission based on a severity level of the alert transmission. The transmitting device may determine a severity level of an alert transmission to be transmitted on one or more available channels. The transmitting device may determine a presence of one or more systems configured to transmit on one or more neighbor channels of the one or more available channels. The transmitting device may select, for the alert transmission, frequency domain resources within the one or more available channels based on the presence of the one or more systems and the severity level. The frequency domain resources for a highest severity level transmission are spaced further apart from the one or more neighbor channels in the frequency domain than resources for a lower severity level transmission. The transmitting device may transmit the alert transmission on the frequency domain resources.

30 Claims, 10 Drawing Sheets

(51) Int. Cl.
*H04B 17/318* (2015.01)
*H04W 72/0453* (2023.01)

(58) Field of Classification Search
USPC .................................. 370/329, 395, 401, 405
See application file for complete search history.

(56) References Cited

U.S. PATENT DOCUMENTS

2003/0193395 A1  10/2003  Ahiska et al.
2009/0154407 A1   6/2009  Jeong et al.
2015/0230105 A1   8/2015  Negus et al.
2021/0360639 A1  11/2021  Weissman et al.

\* cited by examiner

MITIGATION OF INTER-BAND INTERFERENCE TO RECEIVERS BY ALLOCATING ALERTS IN FREQUENCY DOMAIN BASED ON SEVERITY

CROSS REFERENCE TO RELATED APPLICATIONS

This application is a continuation of U.S. patent application Ser. No. 15/930,097 titled "MITIGATION OF INTER-BAND INTERFERENCE TO RECEIVERS BY ALLOCATING ALERTS IN FREQUENCY DOMAIN BASED ON SEVERITY," filed May 12, 2020, which is assigned to the assignee hereof, and incorporated herein by reference in their entirety.

BACKGROUND

Technical Field

The present disclosure relates generally to communication systems, and more particularly, to mitigation of inter-band interference to receivers by allocating alerts in frequency domain based on severity of the alerts.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication. The method may include determining a severity level of an alert transmission to be transmitted on one or more available channels. The method may include determining a presence of one or more systems configured to transmit on one or more neighbor channels of the one or more available channels. The method may include selecting, for the alert transmission, frequency domain transmission resources within the one or more available channels based on the presence of the one or more systems and the severity level. The frequency domain transmission resources for a highest severity level transmission may be spaced further apart from the one or more neighbor channels in the frequency domain than the frequency domain transmission resources for a lower severity level transmission. The method may include transmitting the alert transmission on the frequency domain transmission resources.

In another aspect, the disclosure provides an apparatus for wireless communication. The apparatus may include a memory storing computer-executable instructions and at least one processor coupled with the memory and configured to execute the computer-executable instructions. The at least one processor may be configured to determine a severity level of an alert transmission to be transmitted on one or more available channels. The at least one processor may be configured to determine a presence of one or more systems configured to transmit on one or more neighbor channels of the one or more available channels. The at least one processor may be configured to select, for the alert transmission, frequency domain transmission resources within the one or more available channels based on the presence of the one or more systems and the severity level. The frequency domain transmission resources for a highest severity level transmission may be spaced further apart from the one or more neighbor channels in the frequency domain than the frequency domain transmission resources for a lower severity level transmission. The at least one processor may be configured to transmit the alert transmission on the frequency domain transmission resources.

In another aspect, the disclosure provides an apparatus for wireless communication. The apparatus may include means for determining a severity level of an alert transmission to be transmitted on one or more available channels. The apparatus may include means for determining a presence of one or more systems configured to transmit on one or more neighbor channels of the one or more available channels. The apparatus may include means for selecting, for the alert transmission, frequency domain transmission resources within the one or more available channels based on the presence of the one or more systems and the severity level. The frequency domain transmission resources for a highest severity level transmission are spaced further apart from the one or more neighbor channels in the frequency domain than the frequency domain transmission resources for a lower severity level transmission. The apparatus may include means for transmitting the alert transmission on the frequency domain transmission resources.

In another aspect, the disclosure provides a non-transitory computer-readable medium storing computer executable code. The code when executed by a processor causes the processor to determine a severity level of an alert transmission to be transmitted on one or more available channels.

The code when executed by a processor causes the processor to determine a presence of one or more systems configured to transmit on one or more neighbor channels of the one or more available channels. The code when executed by a processor causes the processor to select, for the alert transmission, frequency domain transmission resources within the one or more available channels based on the presence of the one or more systems and the severity level. The frequency domain transmission resources for a highest severity level transmission are spaced further apart from the one or more neighbor channels in the frequency domain than the frequency domain transmission resources for a lower severity level transmission. The code when executed by a processor causes the processor to transmit the alert transmission on the frequency domain transmission resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
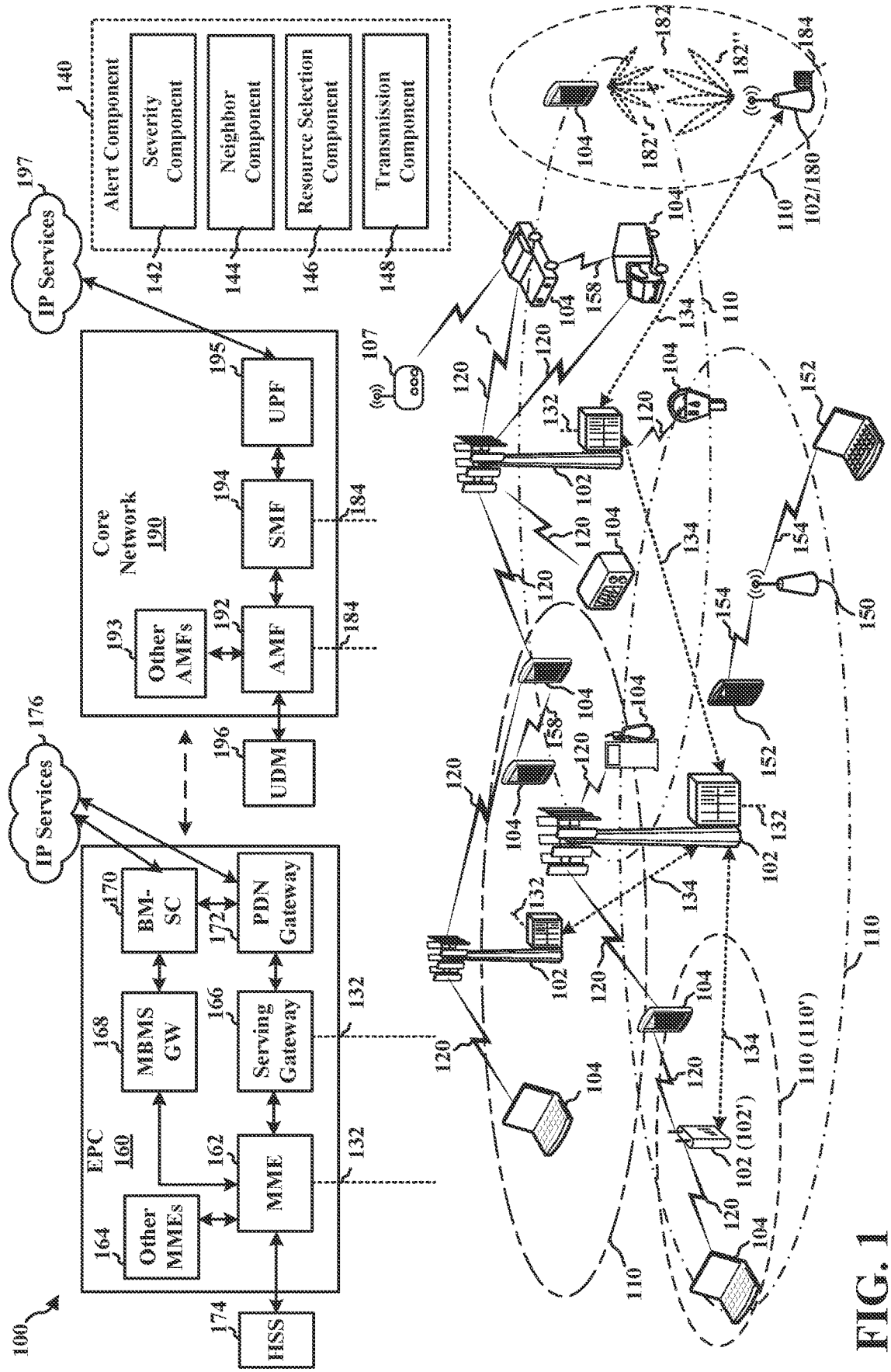
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

CV2X mode-4 operates without infrastructure support using a specified resource pool allocation and semi-persistent scheduling (SPS) to select and reserve resources for transmission. SL control information is transmitted over a physical SL control channel (PSCCH) and the data is transmitted over the physical SL shared channel (PSSCH). Due to the selection of resources, a CV2X signal at the receiver may randomly vary from one sub-frame (SF) to another with different frequency allocations and received signal power for each SF. Accordingly, a CV2X signal may differ from an LTE signal that uses a known frequency and consistent power over time. A CV2X transceiver transmits at very low duty cycle that is about 2%. The CV2X transceiver may transmit periodically (e.g., once per 100 msec, 200 msec or 300 msec).

High level Unlicensed National Information Infrastructure (U-NII)-4 transmitters might impact the performance of V2X receivers causing desense. That is, the V2X receiver may be saturated with interfering signals and unable to detect desired V2X signals. The impact on V2X reception may depend on: the distance between the V2X receiver to the UNII-4 transmitter (assuming line of sight), the frequency offset between the allocated channels of the UNII-4 and V2X, and the spectral emission mask of the UNII-4 transmitters. Proposals for using frequency bands in the range of 5.85 GHz to 5.925 GHz pose concerns with regards of the coexistence between UNII-4 transmitters and V2X receivers operating on adjacent bands. For example, the UNII-4 point to point (P-P) and point to multipoint (P-MP) systems might severely desense V2X receivers operating on channel (CH) 182 and CH 184 (e.g., by causing more than 10 dB interference), especially when the UNII-4 transmitter operates at CH 180. Currently, in the United State of America, CH 172 and CH 184 permit high power transmissions (e.g., Equivalent Isotropically Radiated Power (EIRP) of +40 dBm). Under some proposals, CH 172 operations may move to CH 180 and high power transmissions may be permitted in CH 180, for example, to satisfy dedicated short range communications (DSRC). In this case DSRC transmitters might desense the V2X receivers as well. Similar regulations in other jurisdictions may govern emissions into neighbor channels (e.g., adjacent channels).

In an aspect, the present disclosure provides for allocating alert messages in the frequency domain based upon a severity of the alert. A transmitter in a neighbor band may have a spectral emissions mask (SEM) that that decreases with respect to an offset from a center frequency channel of the neighbor band. Accordingly, depending on which radio transmission systems are present on neighbor channels, some available frequency domain transmission resources may be preferable because a receiving device may experience less inter-band interference. Frequency selection procedures using channel busy ratio (CBR) measurements may steer transmissions toward the preferable channels. By allocating alert messages in the frequency domain based upon a severity of the alert, the alerts with a higher severity level or priority may be more likely to be received. For example, an alert message including safety information about a vehicle (e.g., a sudden stop alert) may be a high severity alert that is transmitted on frequency domain resources such that a receiving device (e.g., a nearby vehicle) is more likely to receive the alert.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

In certain aspects, a UE 104, e.g., a transmitting Vehicle User Equipment (VUE) or other UE, may be configured to transmit messages directly to another UE 104, e.g., UE. The communication may be based on V2V/V2X or other D2D communication, such as Proximity Services (ProSe). Communications based on V2V, V2X, and/or D2D may also be transmitted and received by other transmitting and receiving devices, such as Road Side Unit (RSU) 107, etc. Aspects of the communication may be based on PC5 or sidelink communication.

In an aspect of the present disclosure, one or more UEs 104 may include an alert component 140 that transmits alerts on frequency domain resources selected based on a severity of the alert in order to mitigate interference from neighbor systems. The alert component 140 may include a severity component 142 that determines a severity level of an alert transmission to be transmitted on one or more available channels. The alert component 140 may include a neighbor component 144 that determines a presence of one or more systems configured to transmit on one or more neighbor channels to the one or more available channels. The alert component 140 may include a resource selection component 146 that selects, for the alert transmission, frequency domain transmission resources within the one or more available channels based on the presence of the one or more systems and the severity level. The frequency domain transmission resources for a highest severity level transmission may be spaced further apart from the one or more neighbor channels in the frequency domain than the frequency domain transmission resources for a lower severity level transmission. The alert component 140 may include a transmission component 148 that transmits the alert transmission on the frequency domain transmission resources.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figure 2:
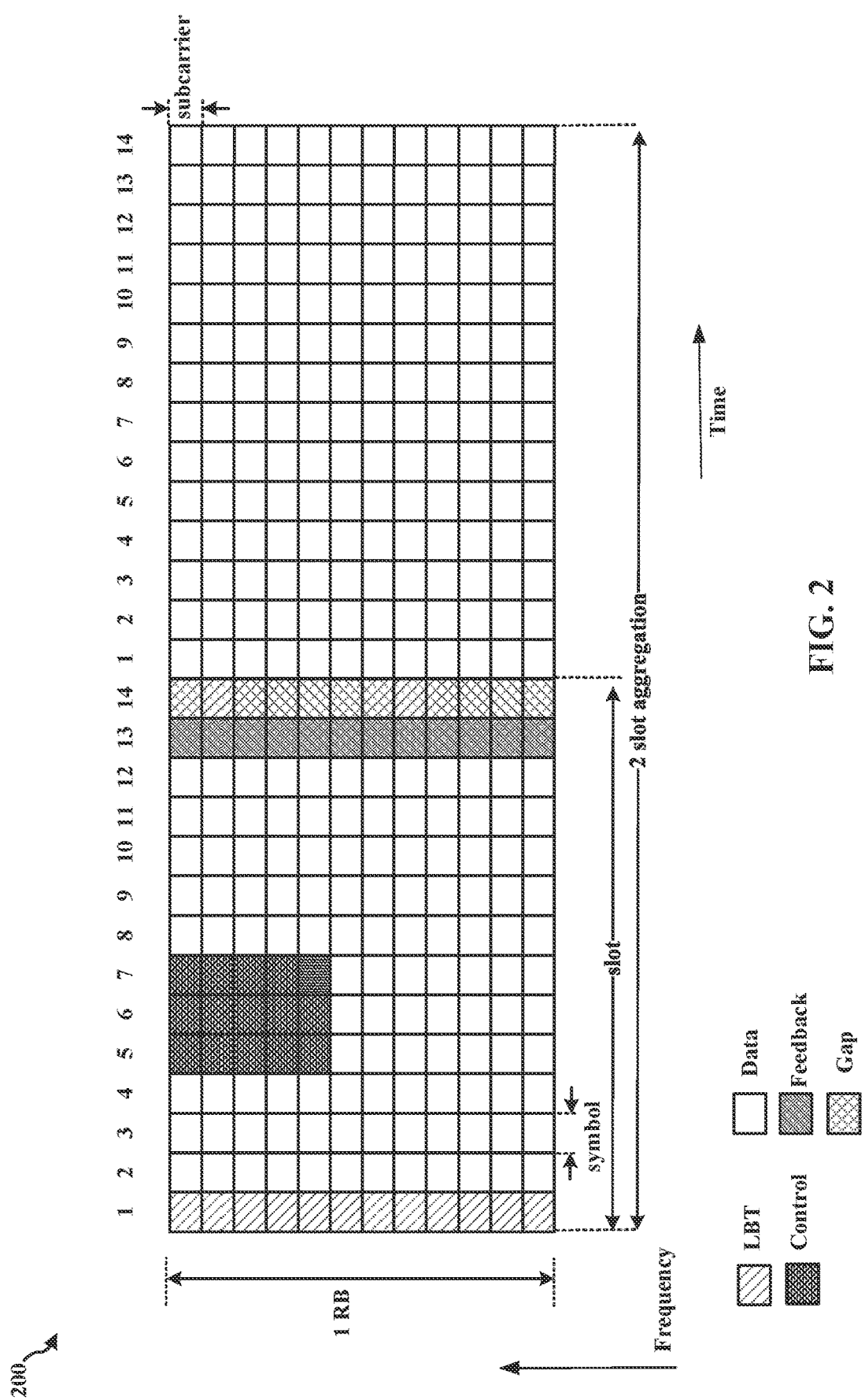
FIG. 2 illustrates an example of a sidelink (SL) slot structure.

FIG. 2 is a diagram 200 illustrating an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include, for example, 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DM-RS). The control information may comprise Sidelink Control Information (SCI). At least one symbol at the beginning of a slot may be used by a transmitting device to perform a Listen Before Talk (LBT) operation prior to transmitting. At least one symbol may be used for feedback, as described herein. Another symbol, e.g., at the end of the slot may be used as a gap. The gap enables a device to switch from operating as a transmitting device to prepare to operate as a receiving device, e.g., in the following slot and vice versa. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 illustrates an example aggregation of two slots. The aggregated number of slots may also be larger than two. When slots are aggregated, the symbols used for feedback and/or a gap symbol may be different that for a single slot.

Figure 3:
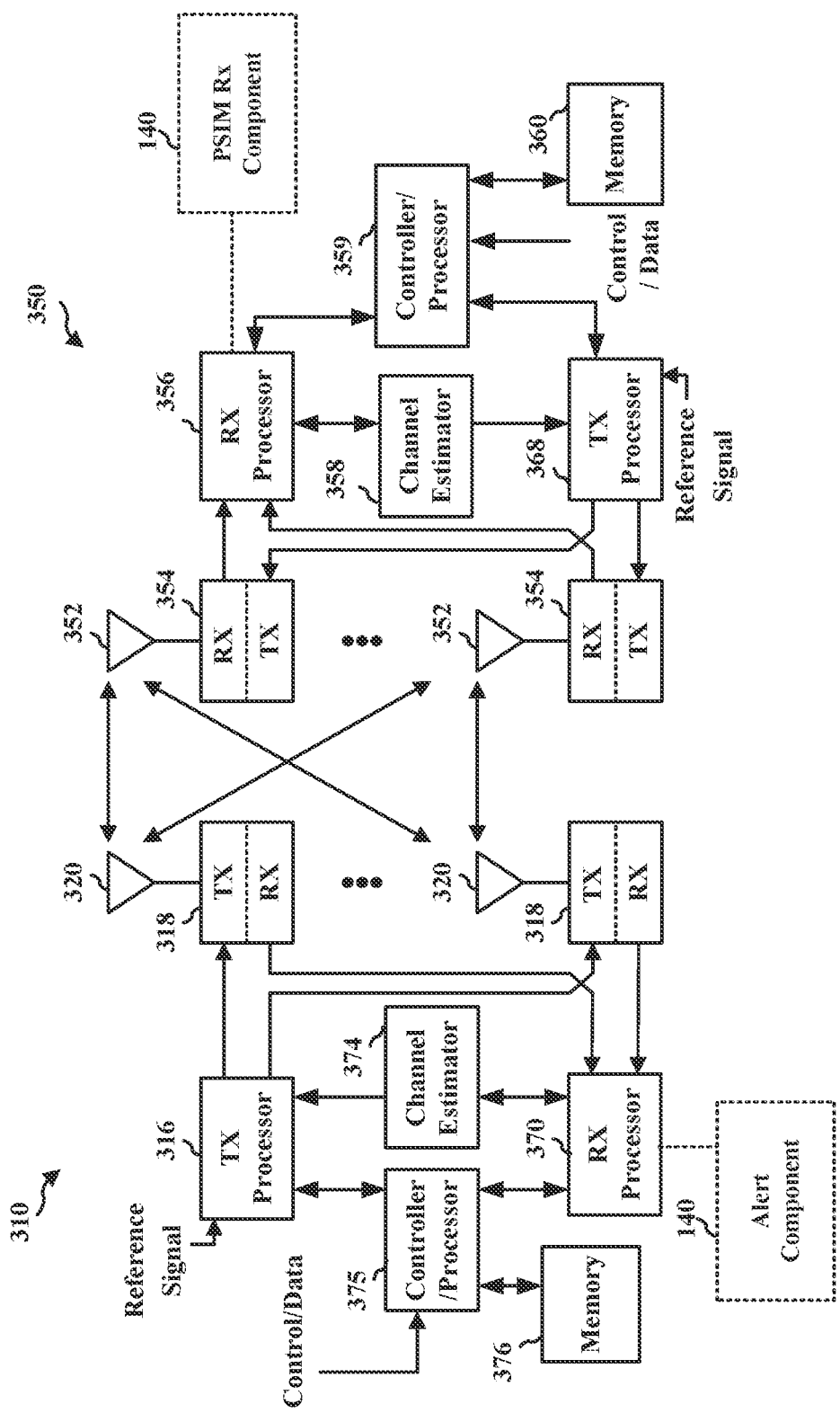
FIG. 3 is a diagram illustrating an example of a first device and a second device involved in wireless communication based, e.g., on vehicle-to-vehicle (V2V), vehicle-to-anything (V2X), and/or device-to-device (D2D) communication.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 316, the RX processor 370, and the controller/processor 375 may be configured to perform aspects in connection with the alert component 140 of FIG. 1.

Figure 4:
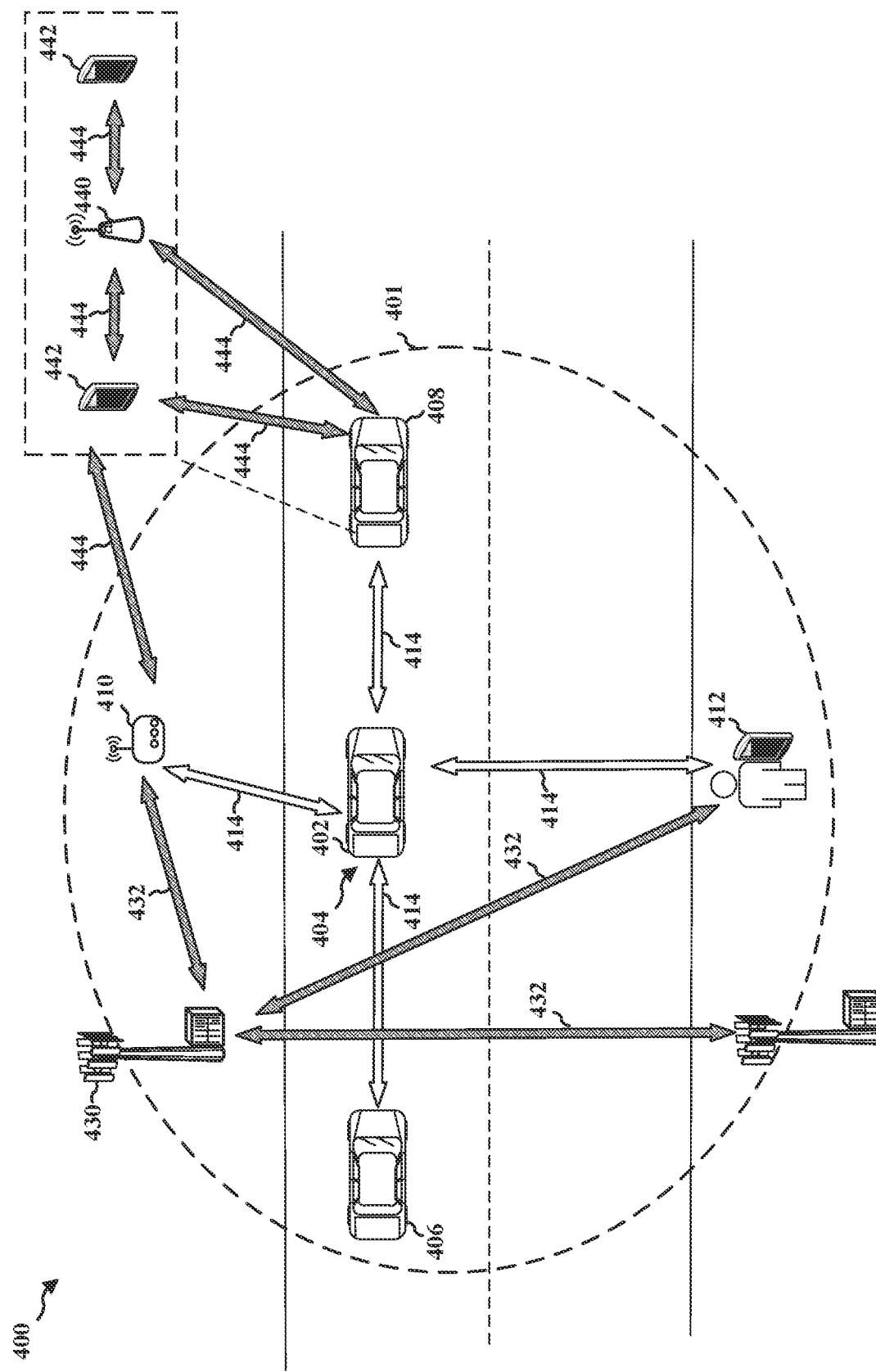
FIG. 4 is a diagram of an example environment for wireless communication between devices based on V2X/V2V/D2D communication.

FIG. 4 illustrates an example environment 400 for wireless communication between devices based on V2X/V2V/D2D communication. A transmitting device 402 may be located within a vehicle 404. The transmitting device 402 may transmit transmissions 414, e.g., comprising a control channel and/or a corresponding data channel, that may be received by receiving devices such as vehicles 406, 408, road side unit (RSU) 410, and pedestrian device 412 within a transmission range 401. The receiving devices may each be capable of operating as a transmitting device in addition to operating as a receiving device. The transmissions 414 may be broadcast or multicast to nearby devices.

The receiving devices may experience interference from neighbor systems that operate on a neighbor band. For example, a V2X system may operate on an intelligent transportation services (ITS) band in the range of 5900-5930 MHz. Neighbor systems may operate on a U-NII 3 or U-NII 4 band at lower frequency or a U-NII 5 band at higher frequency. Neighbor systems may include, for example, a U-MI P-P system or a wireless local area network (WLAN) such as Wi-Fi, which may be located within the vehicle 408. The U-NII P-P system may include transmitters 430 that transmit transmissions 432, which may be unintended transmissions for receiving devices such as the RSU 410 and the pedestrian device 412. The WLAN may include an access point (AP) 440 and one or more stations 442 that transmit transmissions 444, which may be unintended transmissions for the RSU 410 and the vehicle 408, as well as the transmitting device 402, as illustrated. The transmission 444 from the internal car Wi-Fi AP 440 and the user stations 442 may desense the in-car V2X receiver of vehicle 408. The interference to the V2X receiver may depend on isolation between the Wi-Fi AP 440 and the Wi-Fi station antennas to the CV2X car-roof antennas of the vehicle 408, the frequency offset between the allocated Wi-Fi channels and the V2X channels, and the Wi-Fi AP 440 spectral emission mask and the Wi-Fi station 442 spectral emission mask.

Figure 5B:
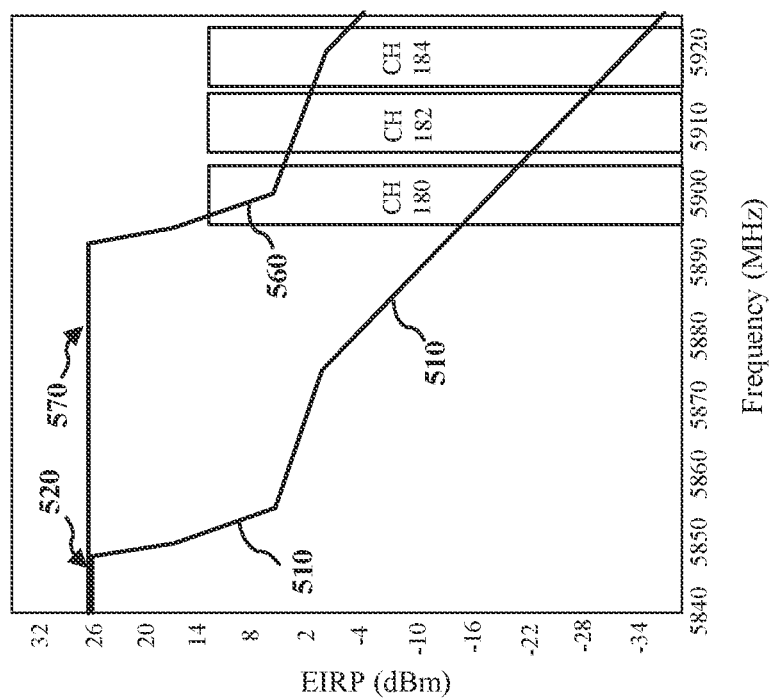
FIG. 5B is a diagram illustrating an example spectrum emission mask for a UNII-4 band.
Figure 5A:
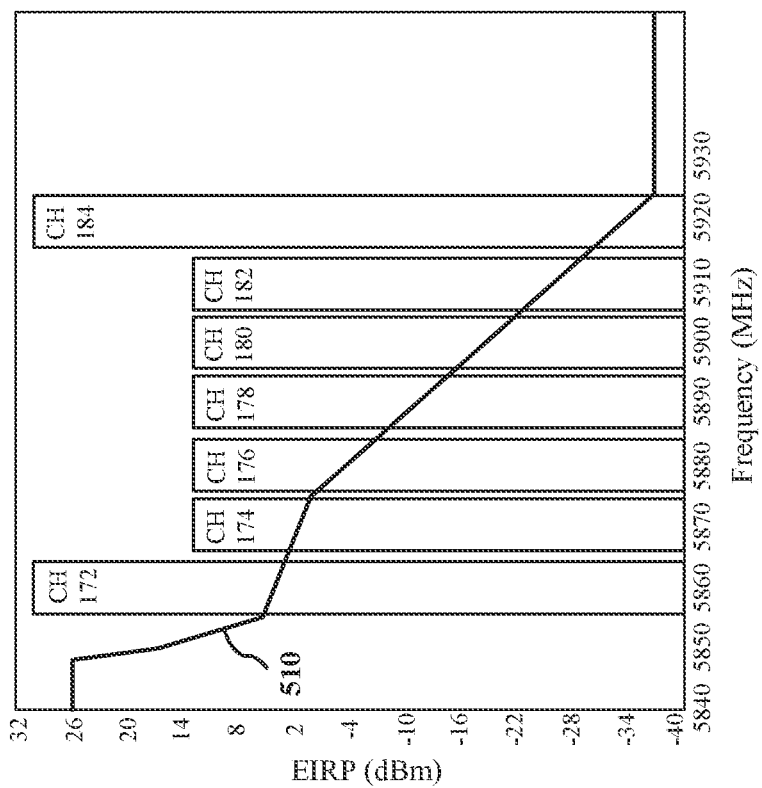
FIG. 5A is a diagram illustrating an example spectrum emission mask for a Unlicensed National Information Infrastructure (U-NII)-3 band.

FIG. 5A is a diagram 500 illustrating an example spectrum emission mask (SEM) 510 for a UNII-3 band 520. The SEM 510 may allow emissions of 26 dBm/MHz within the UNII-3 band 520. The SEM 510 may decrease with respect to an offset from a center frequency channel. For example, the SEM 510 may reduce linearly from 5860 MHz to 5920 MHz. Accordingly, in available channels for an ITS system, the SEM 510 may allow emissions of −18 dBm/MHz in CH 180, −25.4 dBm/MHz in CH 182, and −32.8 dBm/MHz in CH 184.

FIG. 5B is a diagram 550 illustrating an example proposed SEM 560 for a UNII-4 band 570. The SEM 560 may follow the same emission reduction rules as the SEM 510. For example, the SEM 560 may reduce linearly by about 7 dB from the low-edge of the V2X CH 182 up to the high-edge of V2X CH 184. The center frequency of the UNII-4 band, however, may be closer to the available channels for an ITS system. Accordingly, the SEM 560 may allow emissions of 10.2 dBm/MHz in CH 180, 2 dBm/MHz in CH 182, and 0 dBm/MHz in CH 184.

Figure 6:
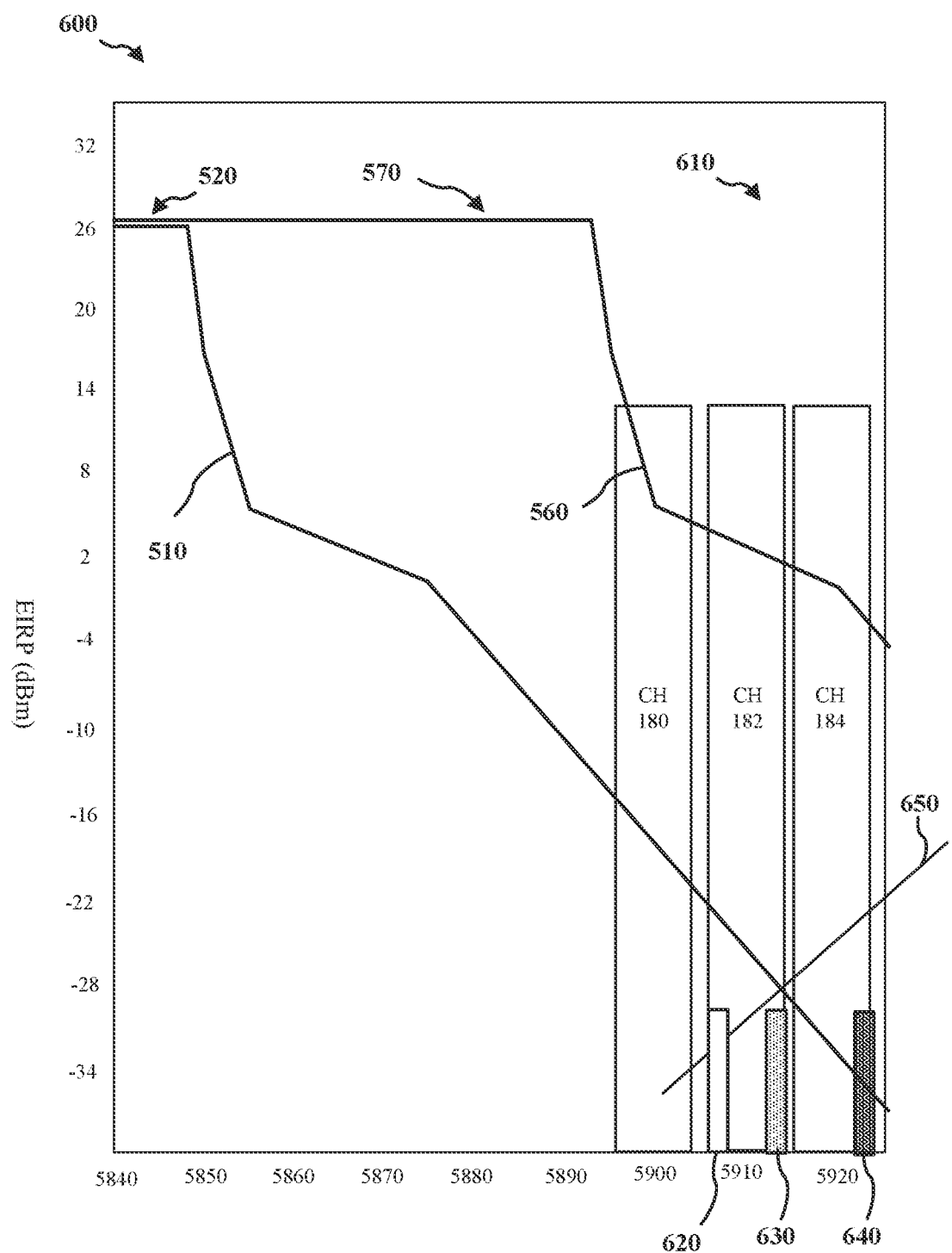
FIG. 6 is a diagram illustrating example selection of frequency domain resources.

FIG. 6 is a diagram 600 illustrating example transmissions on an ITS band 610. The ITS band 610 may include, for example, channels CH 180, 182, and 184. CH 180 may be reserved for DSRS. CH 182 and CH 184 may be available for transmissions in a V2X system. The SEM 510 of the UNII-3 band 520 and the SEM 560 of the UNII-4 band 570 may allow emissions into the ITS band 610. The emission levels may be predictable based on the SEM 510 and the SEM 560. In an aspect of the present disclosure, a transmitting device (e.g., transmitting device 402) may transmit an alert on frequency domain resources based on a severity level of the alert. The transmitting device 402 may prioritize high severity alerts for transmission on frequency domain resources where less interference from neighbor systems is expected.

For example, assuming neighbor systems operating on the UNII-3 band 520 and the UNII-4 band 570 are present, the transmitting device 402 may transmit a high priority alert on a sub-channel 640 located at an upper edge of the available channels of the ITS band 610. The transmitting device 402 may transmit lower priority alerts on sub-channels 620 and 630, which may be located closer to the UNII-3 band 520 and UNII-4 band 570 than the sub-channel 640. Prioritizing the selection of frequency domain resources based on the severity of the alert may improve the likelihood that a high severity alert is correctly received by one or more receiving devices.

In an aspect, a neighbor system may be present on a frequency band with a higher frequency than the transmitting device. For example, a UNII-5 band may be located on frequencies above the ITS band 610. The UNII-5 band may have a SEM 650 that defines allowed emission levels on adjacent channels. Because the UNII-5 band is at frequencies above the ITS band, the SEM 650 may decrease toward lower frequencies of the ITS band 610. If only a system in the UNII-5 band is present, the transmitting device 402 may select a frequency domain resource (e.g., sub-channel 620) at a lower edge of the available channels for high severity alerts. If neighbor systems are located at frequencies above and below the band of the transmitting device, the transmitting device 402 may select a frequency domain resource (e.g., sub-channel 630) that has a lowest expected interference based on the SEMs of the neighbor systems for high severity alerts.

Figure 7:
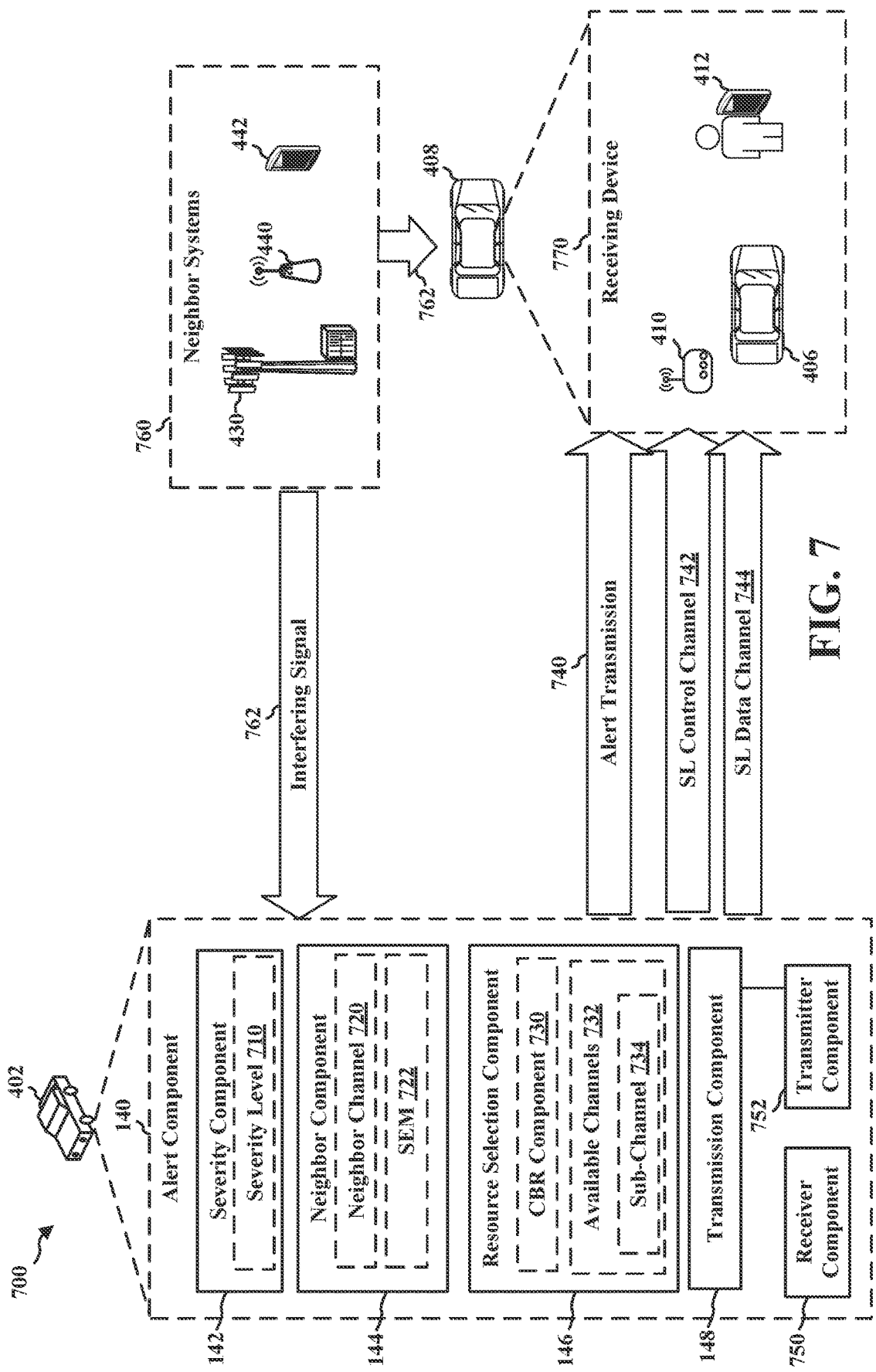
FIG. 7 is a diagram showing example communications and components of a transmitting device and a receiving device.

FIG. 7 is a diagram 700 illustrating example communications and components of a transmitting device 402, which may be an example of a UE 104 operating in a V2X system. The transmitting device 402 may provide alerts to nearby receiving devices 770 such as another vehicle 408 as an alert transmission 740 such as a direct V2X transmission. The transmitting device 402 may receive an interfering signal 762 from a neighbor system 760, such as the AP 440. The interfering signal 762 may also be received at the vehicle 408 and interfere with a receiver, for example, by saturating the receiver (e.g., desense the receiver). The transmitting device 402 may include an alert component 140 that mitigates interference from the neighbor system by prioritizing selection of frequency domain resources based on severity level of the interference.

As discussed above regarding FIG. 1, the alert component 140 may include the severity component 142, the neighbor component 144, the resource selection component 146, and the transmission component 148. The alert component 140 may also include a receiver component 750 and a transmitter component 752. The receiver component 750 may include, for example, a RF receiver for receiving the signals described herein. The transmitter component 752 may include for example, an RF transmitter for transmitting the signals described herein. In an aspect, the receiver component 750 and the transmitter component 752 may be co-located in a transceiver.

The severity component 142 may determine a severity level of the alert transmission 740 to be transmitted on one or more available channels. In an aspect, the severity level 710 may be selected from two or more levels of severity. For example, a simple classification of level of severity may include high severity alerts and all other alerts (e.g., low severity alerts). The severity component 142 may determine whether an alert to be transmitted satisfies criteria for a high severity alert. For example, a high severity alert may be an alert associated with safety or a detected error. In an aspect, each level of severity may be associated with a queue or flow. For example, an originating component or layer may determine the level of severity and place the data for the alert in an appropriate queue or flow.

The neighbor component 144 may determine a presence of one or more systems configured to transmit on one or more neighbor channels 720 of the one or more available channels 732. For example, the neighbor component 144 may control the receiver component 750 to measure the interfering signal 762. For example, the neighbor component 144 may determine a received signal strength (e.g., a received signal strength indicator (RSSI)) for the neighbor channels 720 and/or the available channels 732. If the receiver component 750 detects a received signal strength that satisfies a threshold, the neighbor component 144 may determine that a neighbor system is operating on the neighbor channel. The neighbor component 144 may determine the presence of a neighbor system without decoding the interfering transmission. The neighbor component 144 may also determine a SEM 722 for any systems that are present on the neighbor channel 720. For example, the SEM 722 may be one of the SEM 510, SEM 560, or SEM 650. The SEM 722 may be based on regulations for a geographic area. The neighbor component 144 may determine an expected level of interference to the available channels 732 based on the SEM 722 for any neighbor systems that are present.

The resource selection component 146 may select, for the alert transmission 740, frequency domain transmission resources (e.g., sub-channel 734) within the one or more available channels 732 based on the presence of the one or more systems and the severity level 710. The resource selection component 146 may operate at the MAC layer. In an aspect, the resource selection component 146 may include a channel busy ratio (CBR) component 730 that performs CBR measurements on the frequency domain resources. For example, the CBR measurements may include RSSI measurements and reference signal received power (RSRP) measurements of each sub-channel 734 within the available channels 732. The RSSI may include other transmissions for the V2X system, as well as interference from neighbor systems. The RSRP may be specific for the V2X system and indicate a quality of a channel to one or more receiving devices 770. In an aspect, the resource selection component 146 may determine available sub-channels by excluding one or more of the sub-channels 734 that have an RSSI that exceeds a first threshold. For instance, such channels may be considered busy. The resource selection component 146 may determine a set of priority sub-channels by excluding available sub-channels that have an RSSI greater than a second threshold, which may be less than the first threshold. Accordingly, the set of priority sub-channels may include the sub-channels 734 having the lowest RSSIs. The resource selection component 146 may select a sub-channel 734 for a high severity alert transmission 740 based on the RSRP. For instance, the resource selection component 146 may select a sub-channel from the set of priority sub-channels with a greatest RSRP for a high severity alert. For other alerts with lower severity, the resource selection component 146 may select a sub-channel 734 from the available sub-channels but not the priority sub-channels. Accordingly, the priority sub-channels may be reserved for the high severity alerts.

The transmission component 148 may transmit the alert transmission 740 on the selected frequency domain resources (e.g., sub-channel 734). For example, the transmission component 148 may transmit the alert transmission 740 as a SL transmission including a SL control channel 742 (e.g. PSCCH) and a SL data channel 744 (e.g., PSSCH). The transmission component 148 may transmit the alert transmission 740 via the transmitter component 752, which may perform RF processing on the alert transmission 740.

Figure 8:
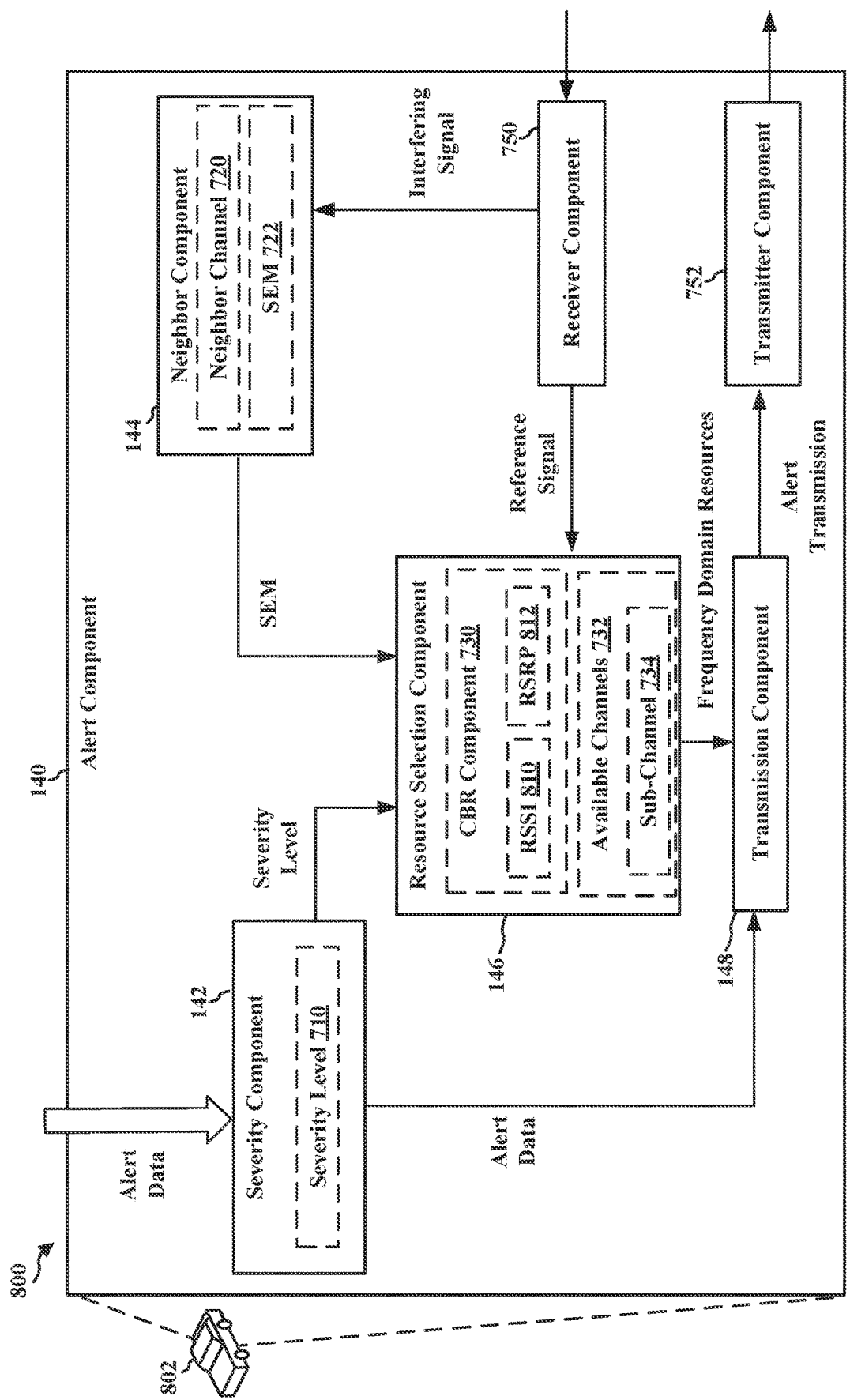
FIG. 8 is a conceptual data flow diagram illustrating the data flow between different means/components in an example transmitting device.

FIG. 8 is a conceptual data flow diagram 800 illustrating the data flow between different means/components in an example transmitting device 802, which may be an example of the UE 104 including the alert component 140.

The receiver component 750 may receive various signals which may include interfering signals (e.g., interfering signal 762 in FIG. 7) and reference signals. The receiver component 750 may provide interfering signals or measurements thereof to the neighbor component 144. The receiver component 750 may provide reference signals or measurements thereof to the resource selection component 146.

The severity component 142 may receive alert data from higher layers or other components. The alert data may include a message to be transmitted and information about the message such as a type of message or a source of the message. The severity component 142 may determine the severity level 710 based on the alert data. The severity component 142 may provide the severity level to the resource selection component 146. The severity component 142 may pass the alert data or the message portion thereof to the transmission component 148.

The neighbor component 144 may receive the interfering signal or measurements thereof from the receiver component 750. For example, measurements of the interfering signal may include an RSSI of a neighbor channel 720. The neighbor component 144 may determine whether a system is present on the neighbor channel 720 (e.g., if the RSSI exceeds a threshold). The neighbor component 144 may determine the SEM 722 for any neighbor systems that are present. The neighbor component 144 may provide the SEM, or an indication of active SEMs, to the resource selection component 146.

The resource selection component 146 may receive the severity level from the severity component 142 and the SEM from the neighbor component 144. The resource selection component 146 may be configured with the available channels 732 including sub-channels 734. Based on the severity level for the an alert transmission, the resource selection component 146 may determine the frequency domain resources (e.g., a sub-channel 734) for transmission. For a high severity alert, the resource selection component 146 may determine a sub-channel 734 that is likely to experience the least interference. In an aspect, the resource selection component 146 may select the sub-channel 734 based on the SEM of the neighbor systems that are present. In another aspect, the CBR component 730 may determine an RSSI 810 and RSRP 812 based on the received reference signals. The resource selection component 146 may determine a set of available sub-channels and priority sub-channels based on the RSSI 810. The resource selection component 146 may select a sub-channel 734 as the frequency domain resources based on the RSRP of the sub-channel 734. The resource selection component 146 may provide the frequency domain resources to the transmission component 148.

The transmission component 148 may transmit the alert transmission on the frequency domain resources via the transmitter component 752. For example, the transmission component 148 may encode the alert data and provide a code block to the transmitter component 752 for RF processing. Accordingly, the alert component 140 may transmit the alert transmission on frequency domain resources selected based on a severity level of the alert.

Figure 9:
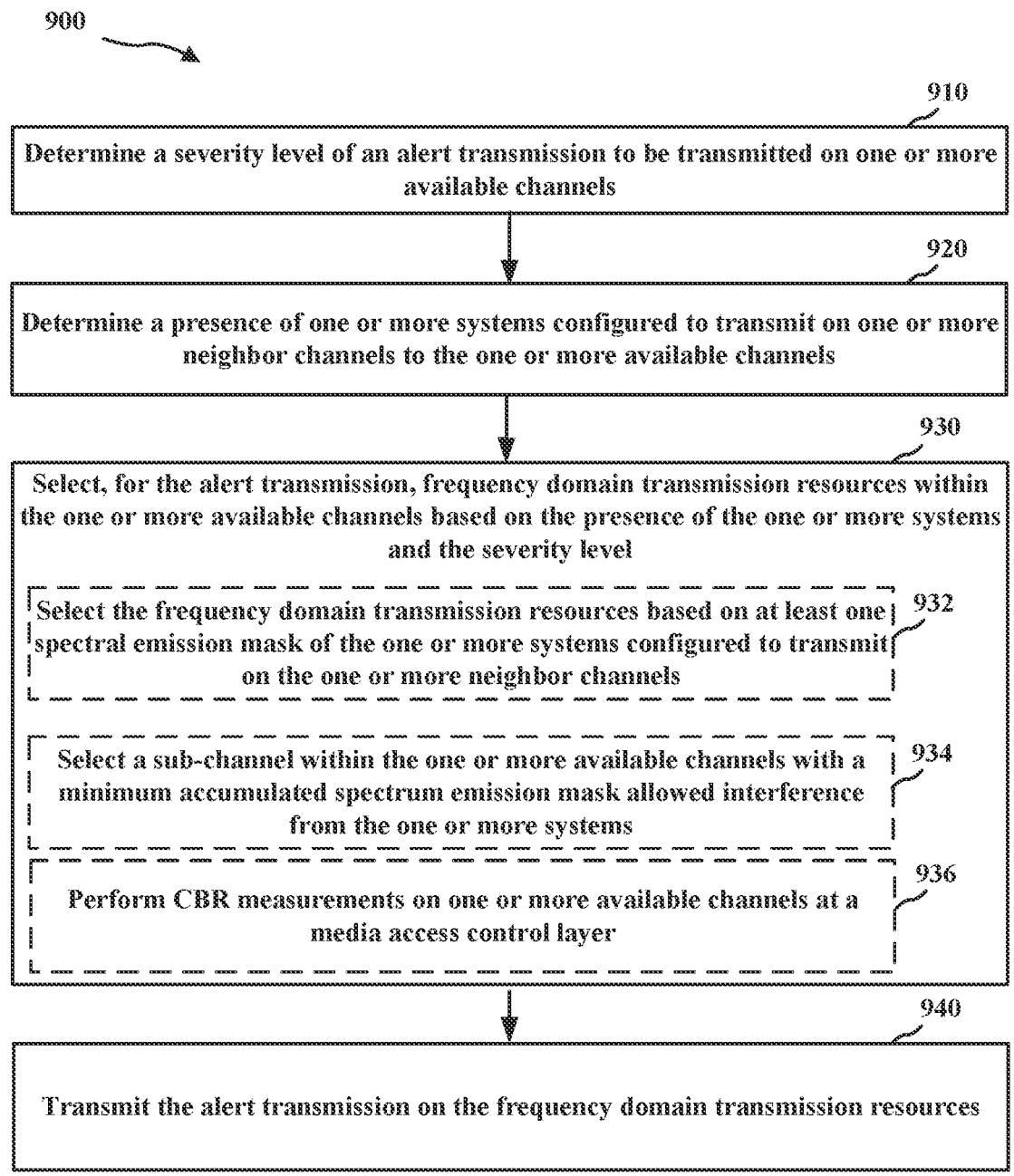
FIG. 9 is a flowchart of an example of a method of wireless communication for a transmitting device.

FIG. 9 is a flowchart of an example method 900 for transmitting an alert transmission on frequency domain resources selected based on a severity level of the alert. The method 900 may be performed by a transmitting device such as a UE 104 (such as the UE 104 or the wireless communication device 310, which may include the memory 376 and which may be the entire UE 104 or a component of the UE 104 such as the alert component 140, TX processor 316, the RX processor 370, or the controller/processor 375).

At block 910, the method 900 may include determining a severity level of an alert transmission to be transmitted on one or more available channels. In an aspect, for example, the UE 104, the controller/processor 375, the TX processor 316, and/or the RX processor 370 may execute the alert component 140 and/or the severity component 142 determine a severity level 710 of an alert transmission 740 to be transmitted on one or more available channels 732. For example, the alert transmission 740 may be an intelligent transportation services (ITS) alert. The severity level of an ITS alert may be based on a type of alert and a device or component that generated the alert. In an implementation, the severity level 710 may be one of a high severity level or a normal severity level. Accordingly, the UE 104, the controller/processor 375, the TX processor 316, and/or the RX processor 370 executing the alert component 140 and/or the severity component 142 may provide means for determining a severity level of an alert transmission to be transmitted on one or more available channels.

At block 920, the method 900 may include determining a presence of one or more systems configured to transmit on one or more neighbor channels of the one or more available channels. In an aspect, for example, the UE 104, the controller/processor 375, the TX processor 316, and/or the RX processor 370 may execute the alert component 140 and/or the neighbor component 144 to determine a presence of one or more systems 760 configured to transmit on one or more neighbor channels 720 of the one or more available channels 732. For example, the one or more systems may be Unlicensed National Information Infrastructure (U-NII) systems operating in the U-NII 3, U-NII 4 or U-NII 5 bands. In another example, the one or more available channels 732 are for a V2X communication system and the one or more systems include an in-vehicle wireless local area network. Accordingly, the UE 104, the controller/processor 375, the TX processor 316, and/or the RX processor 370 executing the alert component 140 and/or the neighbor component 144 may provide means for determining a presence of one or more systems configured to transmit on one or more neighbor channels of the one or more available channels.

At block 930, the method 900 may include selecting, for the alert transmission, frequency domain transmission resources within the one or more available channels based on the presence of the one or more systems and the severity level. In an aspect, for example, the UE 104, the controller/processor 375, the TX processor 316, and/or the RX processor 370 may execute the alert component 140 and/or the resource selection component 146 to select, for the alert transmission 740, frequency domain transmission resources (e.g., sub-channel 734) within the one or more available channels 732 based on the presence of the one or more systems 760 and the severity level 710. For example, at sub-block 932, the block 930 may include selecting the frequency domain transmission resources based on at least one spectral emission mask of the one or more systems configured to transmit on the one or more neighbor channels. The spectral emission mask may indicate an allowed interference level that decreases with respect to an offset from a center frequency channel. In an implementation, the resource selection component 146 may select a sub-channel 734 based on at least one of SEM 510, 560, or 650. At sub-block 934, the block 930 may include selecting a sub-channel within the one or more available channels with a minimum accumulated spectrum emission mask allowed interference from the one or more systems. For example, as shown in FIG. 6, if only UNII-3 and UNII-4 systems are present, the resource selection component 146 may select sub-channel 640. As another example, if a UNII-5 system is present and a UNII-3 system is present, the resource selection component 146 may select sub-channel 630 where the total of the SEM 510 and the SEM 650 is minimized. In another aspect, at sub-block 936, the block 930 may include performing CBR measurements on one or more available channels at a media access control layer. Further details of performing CBR measurements are described below with respect to FIG. 10. In view of the foregoing, the UE 104, the controller/processor 375, the TX processor 316, and/or the RX processor 370 executing the alert component 140 and/or the resource selection component 146 may provide means for selecting, for the alert transmission, frequency domain transmission resources within the one or more available channels based on the presence of the one or more systems and the severity level.

At block 940, the method 900 may include transmitting the alert transmission on the frequency domain transmission resources. In an aspect, for example, the UE 104, the controller/processor 375, the TX processor 316, and/or the RX processor 370 may execute the alert component 140 and/or the transmission component 148 to transmit the alert transmission 740 on the frequency domain transmission resources (e.g., sub-channel 734). Accordingly, the UE 104, the controller/processor 375, the TX processor 316, and/or the RX processor 370 executing the alert component 140 and/or the transmission component 148 may provide means for transmitting the alert transmission on the frequency domain transmission resources.

Figure 10:
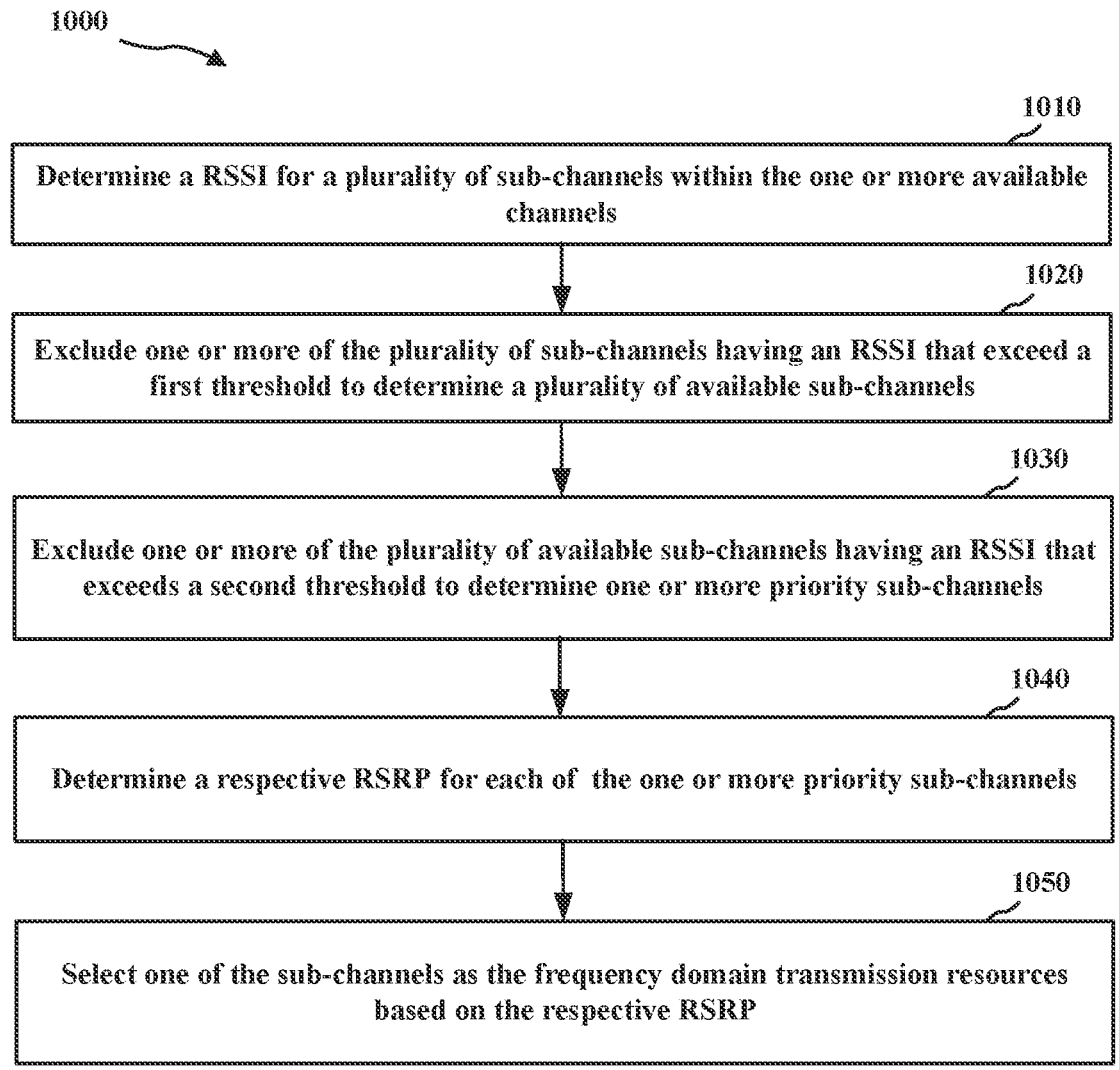
FIG. 10 is a flowchart of an example method of performing channel busy ratio (CBR) measurements.

FIG. 10 is a flowchart of an example method 1000 for performing CBR measurements. The method 1000 may be performed by a UE (such as the UE 104 or the wireless communication device 310, which may include the memory 376 and which may be the entire UE 104 or a component of the UE 104 such as the alert component 140, the resource selection component 146, the CBR component 730, TX processor 316, the RX processor 370, or the controller/processor 375). The method 1000 may correspond to sub-block 936 of the method 900 (FIG. 9).

At block 1010, the method 1000 may include determining a RSSI for a plurality of sub-channels within the one or more available channels. For example, the CBR component 730 may determine a RSSI 810 for a plurality of sub-channels 734 within the one or more available channels 732. At block 1020, the method 1000 may include excluding one or more of the plurality of sub-channels having an RSSI that exceed a first threshold to determine a plurality of available sub-channels. For example, the CBR component 730 may exclude one or more of the plurality of sub-channels 734 having an RSSI 810 that exceeds a first threshold to determine a plurality of available sub-channels. At block 1030, the method 100 may include excluding one or more of the plurality of available sub-channels having an RSSI that exceeds a second threshold to determine one or more priority sub-channels. For example, the CBR component 730 may exclude one or more of the plurality of available sub-channels having an RSSI 810 that exceeds a second threshold to determine one or more priority sub-channels. The second threshold may be less than the first threshold. The frequency domain transmission resources for the highest severity level transmission may be selected from the one or more priority sub-channels. For example, at block 1040, the method 1000 may include determining a RSRP for each of the one or more priority sub-channels. The CBR component 730 may determine a RSRP 812 for each of the one or more priority sub-channels. At block 1050, the method 1000 may include selecting one of the sub-channels as the frequency domain transmission resources based on the respective RSRP. For example, the CBR component 730 may select one of the sub-channels 734 as the frequency domain transmission resources based on the respective RSRP 812.

Some Further Example Implementations

An example method of wireless communication, comprising: determining a severity level of an alert transmission to be transmitted on one or more available channels; determining a presence of one or more systems configured to transmit on one or more neighbor channels of the one or more available channels; selecting, for the alert transmission, frequency domain transmission resources within the one or more available channels based on the presence of the one or more systems and the severity level, wherein the frequency domain transmission resources for a highest severity level transmission are spaced further apart from the one or more neighbor channels in the frequency domain than the frequency domain transmission resources for a lower severity level transmission; and transmitting the alert transmission on the frequency domain transmission resources.

The first example method, wherein selecting the frequency domain transmission resources is based on at least one spectral emission mask of the one or more systems configured to transmit on the one or more neighbor channels.

Any of the above example methods, wherein selecting the frequency domain transmission resources comprises selecting a sub-channel within the one or more available channels with a minimum accumulated spectrum emission mask allowed interference from the one or more systems.

Any of the above example methods, wherein the one or more systems comprise a dedicated short range communications (DSRC) transmitter, a Wi-Fi transmitter, or Unlicensed National Information Infrastructure (U-NII) systems operating in one or more of a U-NII 3 band, U-NII 4 band, or U-NII 5 band.

Any of the above example methods, wherein the at least one spectral emission mask indicates an allowed interference level that decreases with respect to an offset from a center frequency channel.

Any of the above example methods, wherein the alert transmission is an intelligent transportation services (ITS) alert.

Any of the above example methods, wherein selecting the frequency domain transmission resources comprises performing channel busy ratio (CBR) measurements on one or more available channels at a media access control layer.

Any of the above example methods, wherein performing the CBR measurements includes: determining a received signal strength indicator (RSSI) for a plurality of sub-channels within the one or more available channels; excluding one or more of the plurality of sub-channels having an RSSI that exceeds a first threshold to determine a plurality of available sub-channels; and excluding one or more of the plurality of available sub-channels having an RSSI that exceeds a second threshold to determine one or more priority sub-channels, wherein the second threshold is less than the first threshold, wherein the frequency domain transmission resources for the highest severity level transmission are selected from the one or more priority sub-channels.

Any of the above example methods, wherein performing the CBR measurements includes: determining a respective reference signal received power (RSRP) for each of the one or more priority sub-channels; and selecting one of the priority sub-channels as the frequency domain transmission resources based on the respective RSRP.

Any of the above example methods, wherein the one or more available channels are for a vehicle to everything (V2X) communication system and the one or more systems include an in-vehicle wireless local area network.

A first example apparatus for wireless communications, comprising: a memory storing computer-executable instructions; and a processor communicatively coupled with the memory and configured to execute the instructions to perform any of the above example methods.

A second example apparatus for wireless communications, comprising: means for performing any of the above example methods.

An example non-transitory computer-readable medium storing computer-executable instructions to perform any of the above example methods.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:
    selecting, for an alert transmission, frequency domain transmission resources within one or more available channels based on a presence of one or more systems configured to transmit on one or more neighbor channels and a severity level of the alert transmission, wherein selecting the frequency domain transmission resources is based on at least one spectral emission mask of the one or more systems configured to transmit on the one or more neighbor channels; and
    transmitting the alert transmission on the frequency domain transmission resources.

2. The method of claim 1, wherein selecting the frequency domain transmission resources comprises selecting a sub-channel within the one or more available channels with a minimum accumulated spectrum emission mask allowed interference from the one or more systems.

3. The method of claim 1, wherein the one or more systems comprise a dedicated short range communications (DSRC) transmitter, a Wi-Fi transmitter, or Unlicensed National information Infrastructure (U-NII) systems operating in one or more of a U-NII 3 band, U-NII 4 band, or U-NII 5 band.

4. The method of claim 1, wherein the at least one spectral emission mask indicates an allowed interference level that decreases with respect to an offset from a center frequency channel.

5. The method of claim 1, wherein the alert transmission is an intelligent transportation services (ITS) alert.

6. The method of claim 1, wherein selecting the frequency domain transmission resources comprises performing measurements on the one or more available channels at a media access control layer.

7. The method of claim 6, wherein performing the measurements includes:
    determining a received signal strength indicator (RSSI) for a plurality of sub-channels within the one or more available channels;
    excluding one or more of the plurality of sub-channels having an RSSI that exceeds a first threshold to determine a plurality of available sub-channels; and
    excluding one or more of the plurality of available sub-channels having an RSSI that exceeds a second threshold to determine one or more priority sub-channels, wherein the second threshold is less than the first threshold, wherein the frequency domain transmission resources for a highest severity level transmission are selected from the one or more priority sub-channels.

8. The method of claim 7, wherein performing the measurements includes:
    determining a respective reference signal received power (RSRP) for each of the one or more priority sub-channels; and
    selecting one of the priority sub-channels as the frequency domain transmission resources based on the respective RSRP.

9. The method of claim 1, wherein the one or more available channels are for a vehicle to everything (V2X) communication system and the one or more systems include an in-vehicle wireless local area network.

10. An apparatus for wireless communication, comprising:
    a memory storing computer-executable instructions; and
    at least one processor coupled with the memory and configured to execute the computer-executable instructions to:
    select, for an alert transmission, frequency domain transmission resources within one or more available channels based on a presence of one or more systems configured to transmit on one or more neighbor channels, at least one spectral emission mask of the one or more systems configured to transmit on the one or more neighbor channels, and a severity level of the alert transmission; and
    transmit the alert transmission on the Frequency domain transmission resources.

11. The apparatus of claim 10, wherein the at least one processor is configured to select a sub-channel within the one or more available channels with a minimum accumulated spectrum emission mask allowed interference from the one or more systems.

12. The apparatus of claim 10, wherein the one or more systems comprise a dedicated short range communications (DSRC) transmitter, a Wi-Fi transmitter, or Unlicensed National Information Infrastructure (U-NII) systems operating in one or more of a U-NII 3 band, U-NII 4 band, or U-NTT 5 band.

13. The apparatus of claim 10, wherein the at least one spectral emission mask indicates an allowed interference level that decreases with respect to an offset from a center frequency channel.

14. The apparatus of claim 10, wherein the alert transmission is an intelligent transportation services (ITS) alert.

15. The apparatus of claim 10, wherein the at least one processor is configured to perform measurements on the one or more available channels at a media access control layer.

16. The apparatus of claim 15, wherein the at least one processor is configured to:
  determine a received signal strength indicator (RSSI) for a plurality of sub-channels within the one or more available channels;
  exclude one or more of the plurality of sub-channels having an RSSI that exceeds a first threshold to determine a plurality of available sub-channels; and
  exclude one or more of the plurality of available sub-channels having an RSSI that exceeds a second threshold to determine a plurality of priority sub-channels, wherein the second threshold is less than the first threshold, wherein the frequency domain transmission resources for a highest severity level transmission are selected from the plurality of priority sub-channels.

17. The apparatus of claim 16, wherein the at least one processor is configured to:
  determine a respective reference signal received power (RSRP) for each of the plurality of priority sub-channels; and
  select one of the priority sub-channels as the frequency domain transmission resources based on the respective RSRP.

18. The apparatus of claim 10, wherein the one or more available channels are for a vehicle to everything (V2X) communication system and the one or more systems include an in-vehicle wireless local area network.

19. An apparatus for wireless communication, comprising:
  means for selecting, for an alert transmission, frequency domain transmission resources within one or more available channels based on a presence of one or more systems configured to transmit on one or more neighbor channels, at least one spectral emission mask of the one or more systems configured to transmit on the one or more neighbor channels, and a severity level of the alert transmission, wherein the frequency domain transmission resources for a highest severity level transmission are spaced further apart from the one or more neighbor channels in the frequency domain than the frequency domain transmission resources for a lower severity level transmission; and
  means for transmitting the alert transmission on the frequency domain transmission resources.

20. The apparatus of claim 19, wherein the means for selecting the frequency domain transmission resources is configured to select a sub-channel within the one or more available channels with a minimum accumulated spectrum emission mask allowed interference from the one or more systems.

21. The apparatus of claim 19, wherein the one or more systems comprise a dedicated short range communications (DSRC) transmitter, a Wi-Fi transmitter, or Unlicensed National Information Infrastructure (U-NII) systems operating in one or more of a U-NII 3 band, U-NII 4 band, or U-NII 5 band.

22. The apparatus of claim 19, wherein the at least one spectral emission mask indicates an allowed interference level that decreases with respect to an offset from a center frequency channel.

23. The apparatus of claim 19, wherein the alert transmission is an intelligent transportation services (ITS) alert.

24. The apparatus of claim 19, wherein the means for selecting the frequency domain transmission resources is configured to perform measurements on the one or more available channels at a media access control layer.

25. The apparatus of claim 24, wherein the means for determining the presence of one or more systems is configured to:
  determine a received signal strength indicator (RSSI) for a plurality of sub-channels within the one or more available channels;
  exclude one or more of the plurality of sub-channels having an RSSI that exceeds a first threshold to determine a plurality of available sub-channels; and
  exclude one or more of the plurality of available sub-channels having an RSSI that exceeds a second threshold to determine a plurality of priority sub-channels, wherein the second threshold is less than the first threshold, wherein the frequency domain transmission resources for a highest severity level transmission are selected from the plurality of priority sub-channels.

26. The apparatus of claim 25, wherein the means for determining the presence of one or more systems is configured to:
  determine a respective reference signal received power (RSRP) for each of the plurality of priority sub-channels; and
  select one of the priority sub-channels as the frequency domain transmission resources based on the respective RSRP.

27. A non-transitory computer-readable medium storing computer executable code, the code when executed by a processor causes the processor to:
  select, for an alert transmission, frequency domain transmission resources within one or more available channels based on a presence of one or more systems configured to transmit on one or more neighbor channels, at least one spectral emission mask of the one or more systems configured to transmit on the one or more neighbor channels, and a severity level of the alert transmission; and
  transmit the alert transmission on the frequency domain transmission resources.

28. The non-transitory computer-readable medium of claim 27, wherein the code to select the frequency domain transmission resources comprises code to perform measurements on the one or more available channels at a media access control layer.

29. The non-transitory computer-readable medium of claim 28, wherein the code to perform the measurements includes code to:

determine a received signal strength indicator (RSSI) for a plurality of sub-channels within the one or more available channels;

exclude one or more of the plurality of sub-channels having an RSSI that exceeds a first threshold to determine a plurality of available sub-channels; and exclude one or more of the plurality of available sub-channels having an RSSI that exceeds a second threshold to determine one or more priority sub-channels, wherein the second threshold is less than the first threshold, wherein the frequency domain transmission resources for a highest severity level transmission are selected from the one or more priority sub-channels.

30. The non-transitory computer-readable medium of claim 29, wherein the code to perform the measurements includes code to:

determine a respective reference signal received power (RSRP) for each of the one or more priority sub-channels; and select one of the priority sub-channels as the frequency domain transmission resources based on the respective RSRP.

\* \* \* \* \*